US006278121B1

(12) United States Patent
Laube et al.

(10) Patent No.: US 6,278,121 B1
(45) Date of Patent: Aug. 21, 2001

(54) IONIZATION CHAMBER FOR RADIOMETRIC MEASURING INSTRUMENTS

(75) Inventors: Siegfried Laube, Dresden; Franz-Josef Urban, Heidenau; Steffen Hildebrandt, Dresden, all of (DE)

(73) Assignee: Vacutec Messtechnik GmbH, Dresden (DE)

( * ) Notice: Subject to any disclaimer, the term of this patent is extended or adjusted under 35 U.S.C. 154(b) by 0 days.

(21) Appl. No.: 09/381,555

(22) PCT Filed: Mar. 20, 1998

(86) PCT No.: PCT/DE98/00818

§ 371 Date: Dec. 6, 1999

§ 102(e) Date: Dec. 6, 1999

(87) PCT Pub. No.: WO98/43116

PCT Pub. Date: Oct. 1, 1998

(30) Foreign Application Priority Data

Mar. 21, 1997 (DE) ..................... 197 12 032
Jul. 23, 1997 (DE) ..................... 197 31 608

(51) Int. Cl.[7] ..................... G01T 1/185; H01J 47/00
(52) U.S. Cl. ..................... 250/389
(58) Field of Search ..................... 250/374, 385.1, 250/389

(56) References Cited

U.S. PATENT DOCUMENTS 3,575,597 * 4/1971 Kim ..................... 250/43.5 R
3,676,682 * 7/1972 Falk ..................... 250/83.6
3,914,607 * 10/1975 Cho et al. ..................... 250/308
4,253,024 * 2/1981 Perschmann ..................... 250/374
4,301,368 * 11/1981 Riihimaker ..................... 250/385
4,751,391 * 6/1988 Eberhard et al. ..................... 250/385.1
5,010,252 * 4/1991 Steele ..................... 250/385.1

FOREIGN PATENT DOCUMENTS 1040707 10/1958 (DE) .
19545340 6/1997 (DE) .
2105649 4/1972 (FR) .
62073548 4/1987 (JP) .

* cited by examiner

*Primary Examiner*—Jack Berman
*Assistant Examiner*—Johnnie L Smith, II
(74) *Attorney, Agent, or Firm*—Jordan and Hamburg LLP

(57) ABSTRACT

The invention relates to an ionization chamber for radiometric measuring instruments, specially for transversal surface measurement systems, comprising a housing with filling gas therein, having at least one radiation input window and a plurality of collector electrodes in the housing with insulated, outward leading electrical connections, whereby an electrical potential difference (voltage) exists between the housing and the collector electrodes. The inventive device enables an ionization chamber for radiometric measuring instruments to be created, specially for transversal surface measurement systems. Said chamber is sufficiently sensitive and meets the usual high requirements of ionization chambers with regard to vacuum-tightness, base current and temperature dependency. This is achieved by subdividing a plurality of adjacent and mutually defining sections (2) inside the housing (3) with the respective collector electrodes (6), by connecting the collector electrodes (6) to electrical connections (14) which are guided outwards through the insulator (13; 17) of a gas-tight multiple through-passage, and by providing the insulator (13; 17) with an electrically conductive area encompassing all the electrical connections (14). Said area is electrically insulated from the housing (3) and from the connections (14). However, it lies within the electrode potential when in a state devoid of electricity.

24 Claims, 9 Drawing Sheets

IONIZATION CHAMBER FOR RADIOMETRIC MEASURING INSTRUMENTS

The invention relates to an ionization chamber for radiometric measuring instruments, particularly for traversing systems, which measure the mass per unit area and consist of a housing, which is filled with a gas and has at least one radiation inlet window and a number of collector electrodes in the housing with insulated electrical connections, which are taken to the outside, there being an electrical potential difference (voltage) between the housing and the collector electrodes.

Figure 1:
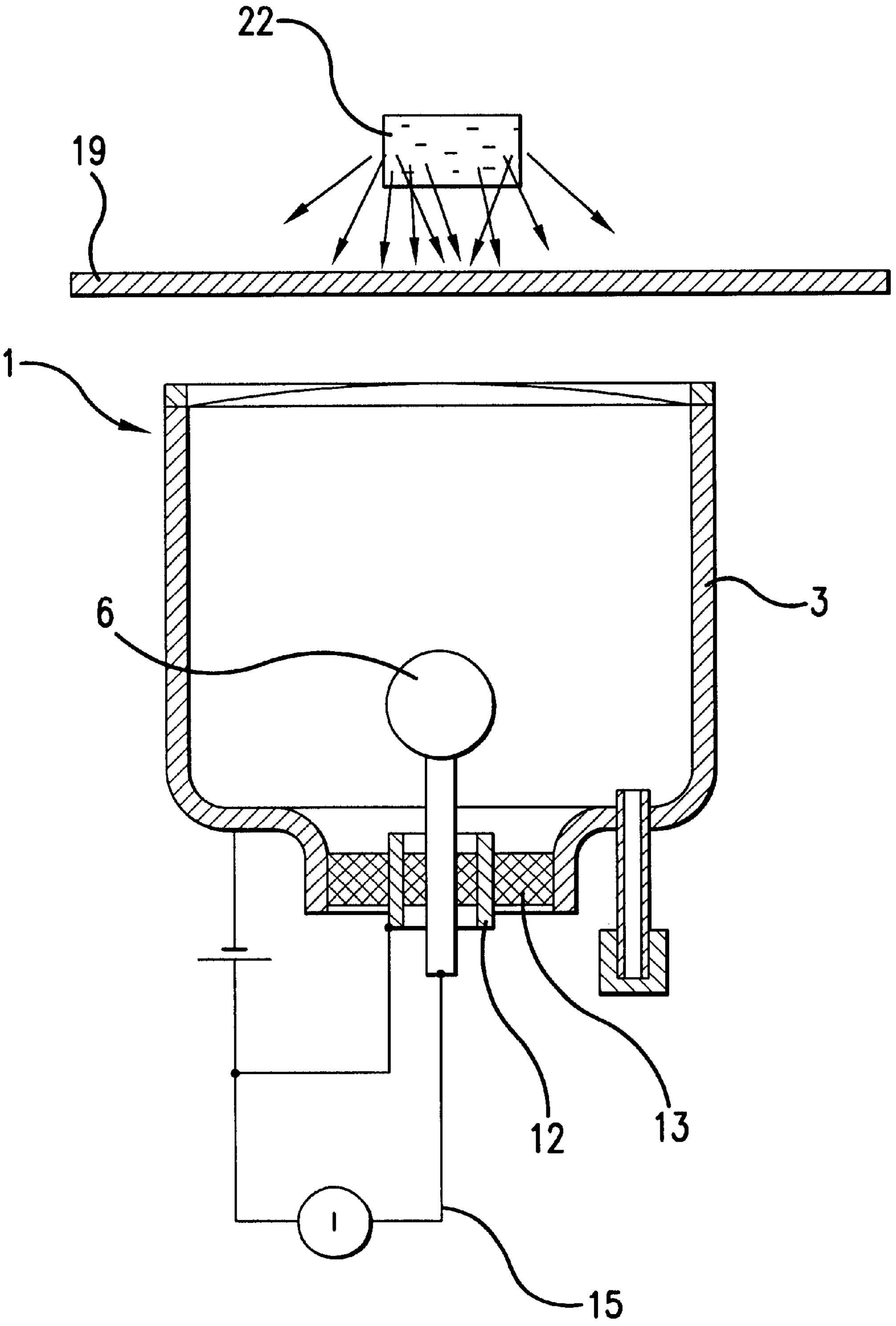
FIG.1 PRIOR ART

In industrial equipment for the radiometric measuring of sheets of materials, ionization chambers usually are used as detectors during their production or processing. The ionization chambers consist of a housing, a collector electrode and a filler gas. The radiation, entering through the radiation inlet window, produces free charge carriers (ions and electrons) in the filler gas. A voltage, applied between the electrode and the housing, produces in the chamber an electrical field, which the charge carriers follow. The thus resulting current between the electrode and the housing (in the $\mu$A up to the pA range) is measured and converted, for example, into voltage signals. The measurement signal, highly insulated from the housing, is passed from the interior of the chamber over a gas-tight feed-through with a connection to a signal lead to the outside. A ring electrode, which acts as a guard ring, is introduced around the connection in the insulating layer of the feed-through. This guard ring prevents the voltage dropping off directly over a continuous insulated segment between the housing and the electrode, as shown in FIG. 1 as state of the art for an axially symmetrical ionization chamber. The guard ring thus prevents the occurrence of interfering leakage currents, so that the basic current of an ionization chamber without radiation is minimal at its operating voltage (generally a few hundred volts), and is typically less than 0.1 pA.

The radiometric system of measuring in a production or processing plant consists of a source of ionizing radiation, the detector, that is, the ionization chamber and the material to be measured. The degree of interaction between the radiation and the material being measured (such as absorption, back scatter, fluorescence) is a measure of the amount of material to be determined, mostly given as weight per unit area or density. The system of radiation source and detector can in most places be moved transversely to the sheet of material.

With the transition from a single detector to a detector with several independent measuring sites, new possibilities have opened up in the technique of measuring the weight per unit area for solving previously unsurmounted measurement problems. The additional information, so developed, offers a base for a more effective and accurate control of production processes.

On the one hand, the local resolution of the transverse profile can be refined.

The local resolution of a measurement of a transverse profile with the conventional, axially symmetrical ionization chamber is limited naturally by the diameter of the chamber. For example, the resolvable structure is stated in the technical literature to be twice the extent of the detector. A finer local resolution must be achieved with detectors of a lesser extent in the direction at right angles to the sheet of material. These detectors can be disposed, so that a transverse profile section can be measured with a resolution higher than in the case of a corresponding single detector.

The use of an array of semiconductor detectors (silicon pin diodes), which are operated in the current mode, is known. However, the semiconductor detectors are highly susceptible to temperature changes of the type that occur constantly in industrial production plants. As a result, the measurement signals are distorted.

On the other hand, the energy spectrum can be used as a consequence of the interaction of X-rays with the material being measured.

For certain coating processes, the atomic number of the substrate differs only slightly from the atomic number of the layer that is to be applied (for example, zinc on steel). In this case, the known beta back scattering method is unsuitable. However, a possible X-ray fluorescence radiation of the two-component system provides information about the thickness of the layer applied. The energy of the fluorescence radiation is specific for each element, while the intensity depends on the amount of material, which is being investigated and, with that, on the thickness of the layer. Due to the K edge effect, selective filters strongly absorb, for example, the X-rays emanating from the layer and largely transmit the radiation emanating from the substrate. Two detector sections with different filters can, after being calibrated, be used to measure one component of the two-component system.

These detector sections can be disposed in a multi-chamber, as described. Beyond the two-component system, n−1 components of an n-component system can be determined with a chamber with n measurement sections in principle in certain cases.

The technique described is published as U.S. Pat. No. 3,514,602. A chamber is divided here into two sections, the signals of which are subtracted from one another as analog signals, in order to obtain an output signal as a measure of the desired quantity to be measured. This corresponded to the state of the art at that time. The present state of the art corresponds to a converted (low impedance) chamber section output signal, which can be supplied to appropriate, further, computer-based or processor-based processing.

These measurement problems, listed by way of examples, therefore led to the object of developing an ionization chamber for radiometric measuring instruments, especially for traversing systems, which measure the mass per unit area, have an adequate sensitivity and, at the same time, make available the customary good values of ionization chambers with respect to vacuum tightness, basic current and temperature dependence.

This objective, on which the invention is based, is accomplished by an ionization chamber of the type named above owing to the fact that the interior of the housing is divided into a plurality of adjacent and mutually delineated measurement sections with the respective collector electrodes, that the collector electrodes are connected with electrical connections, which are taken through the insulator of a gas-tight multiple lead-through to the outside and that the insulator is provided with an electrically conductive region, which surrounds the electrical connections jointly and is insulated electrically from the housing as well as from the connections, yet lies in a currentless state at the electrode potential.

Due to this inventive solution, it becomes possible to measure the weight per unit area by a method which, when compared to a method using conventional ionization chambers, achieves, for example, a finer local resolution or also an energy selection of the radiation emanating from the site of the measurement.

Further developments of the invention arise out of the dependent claims.

In this regard, the region, surrounding the connections, is constructed as a guard ring in the form of a metal ring, which surrounds several collector electrode connections simultaneously. The insulator, between the housing and the guard ring, can be part of an insulating pipe, the one metal contact of which is connected gas-tight with the housing. A multiple feed-through can be connected gas-tight with the opposite metal contact.

In a variation of the invention, the guard ring can also be constructed as ajunction electrode, which surrounds the connections on at least one side of the insulator. Preferably, however, the junction electrode is disposed on the inside as well as on the outside of the housing. The two junction electrodes are connected electrically with one another and jointly with a connector pin and accordingly are at the potential of the guard ring.

In a continuation of the invention, the measurement sections are separated from one another by partitions, which extend as far as the immediate vicinity of the radiation entry window of the corresponding section, in order to prevent measurement sections affecting one another mutually, perhaps due to the drift of charge carriers.

The collector electrodes cannot be held mechanically by the signal leads themselves, as they are generally in conventional single chambers. Instead, they are insulated, mounted and fixed on a carrier within the chamber, which carrier is at the potential of the guard ring and, in turn, is insulated from the chamber housing, which leads to the protection of the guard ring principle.

The electrodes can be shaped differently, depending on the requirements. For example, the electrodes may consist of a pre-stressed sheet or sheet strip or of several pre-stressed wires.

In a further development of the invention, the ionization chamber has a rectangular or square cross section, the measurement sections being disposed next to one another or in two or more rows flush or offset.

In a further variation, the ionization chamber has a circular cross section. In this case, it is appropriate if the measurement sections in the ionization chamber are disposed radially adjacent to one another. In principle, it is also possible to arrange the measurement sections in the ionization chamber concentrically to one another.

Furthermore, it is possible to dispose filters for X-radiation above the radiation inlet window, a filter advisably being assigned to each measurement section of the ionization chamber.

If the filters have different filtering properties, which are matched to one another, the individual measurement sections are exposed to differently filtered radiation.

In a further development of the invention, the radiation inlet windows, in the case of multi-row measurement sections disposed offset to one another, are covered partly in such a manner that the seamless, unambiguous measurement of a transverse profile section becomes possible.

Figure 3:
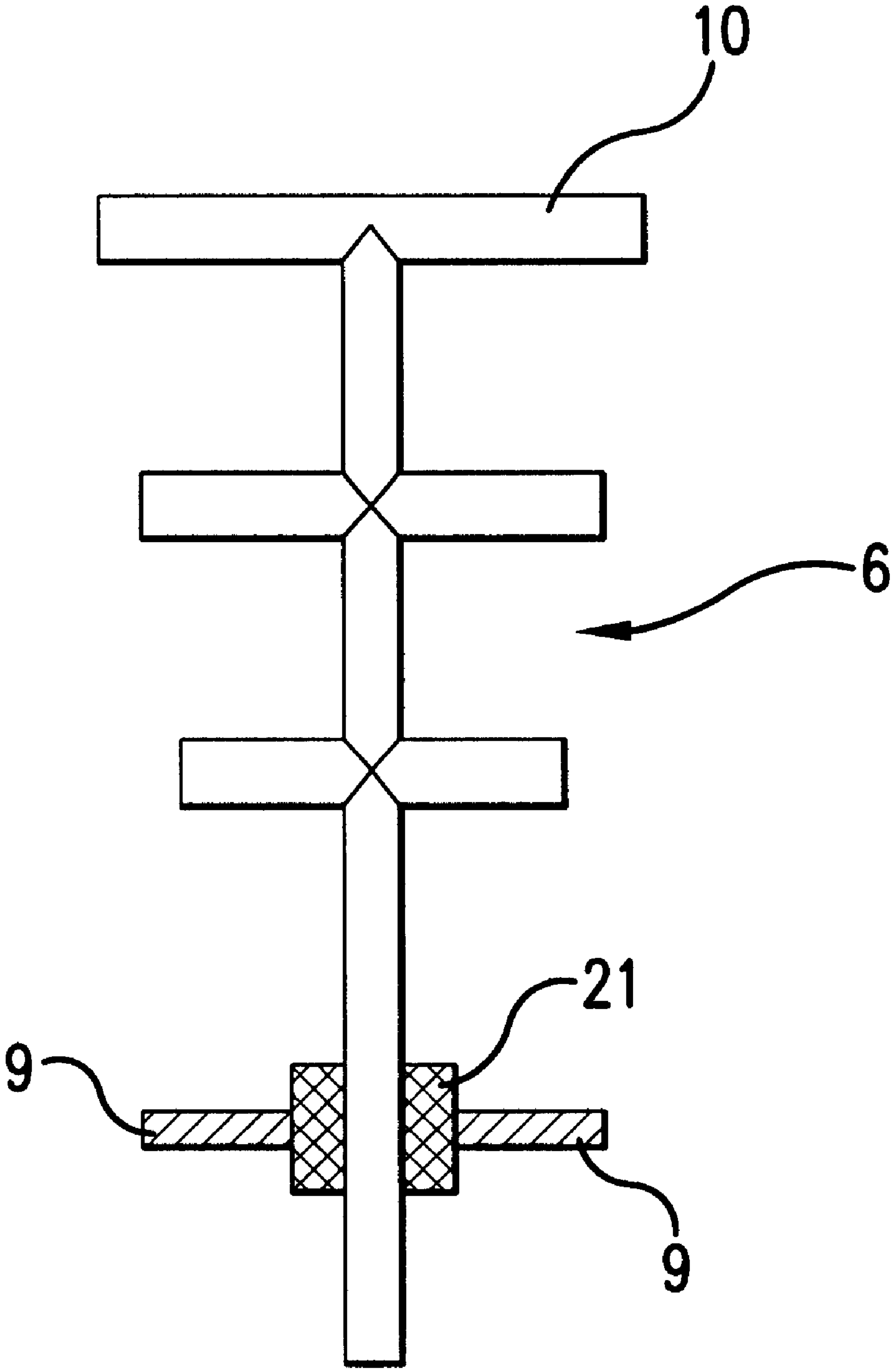
Figure 4:
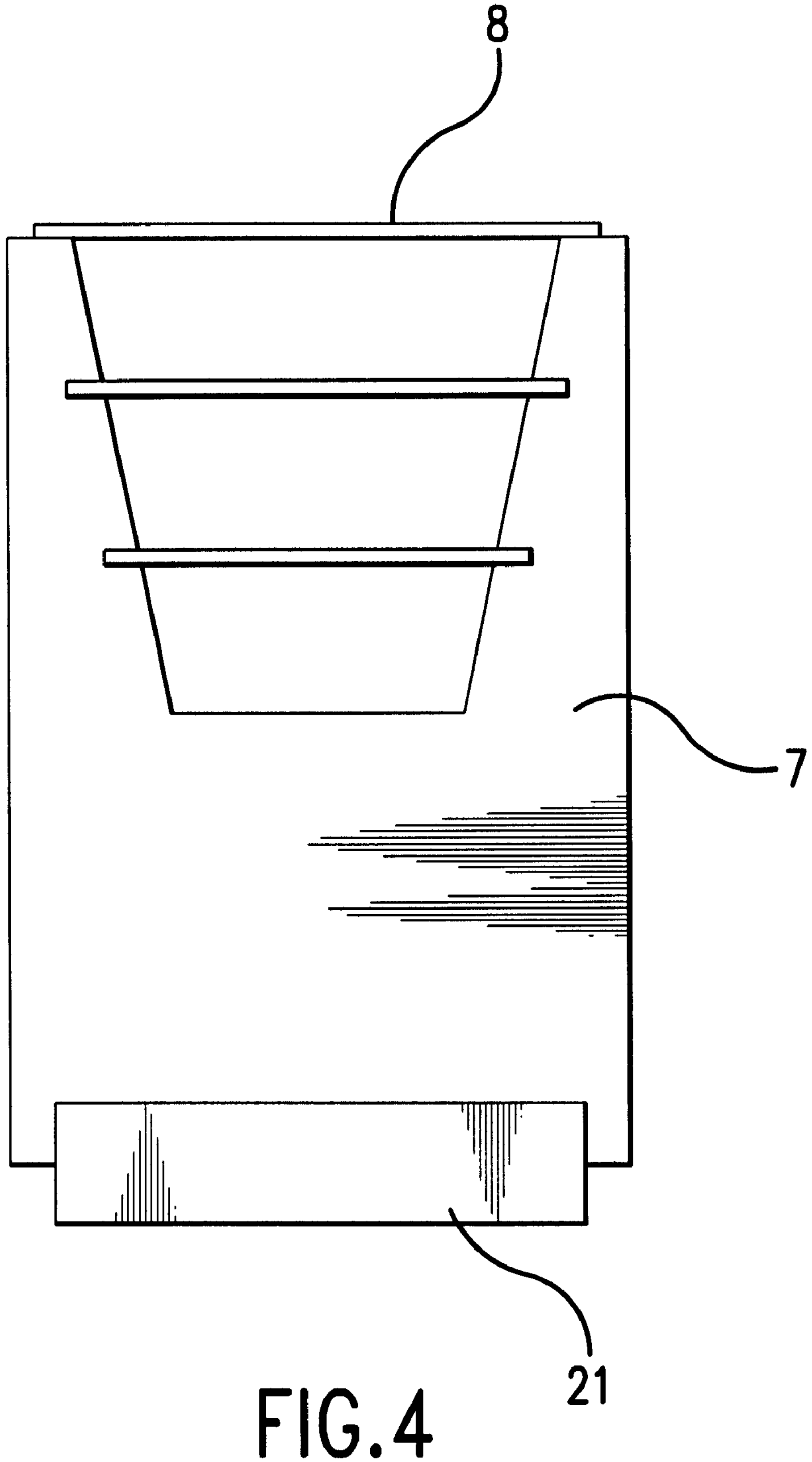
Figure 5:
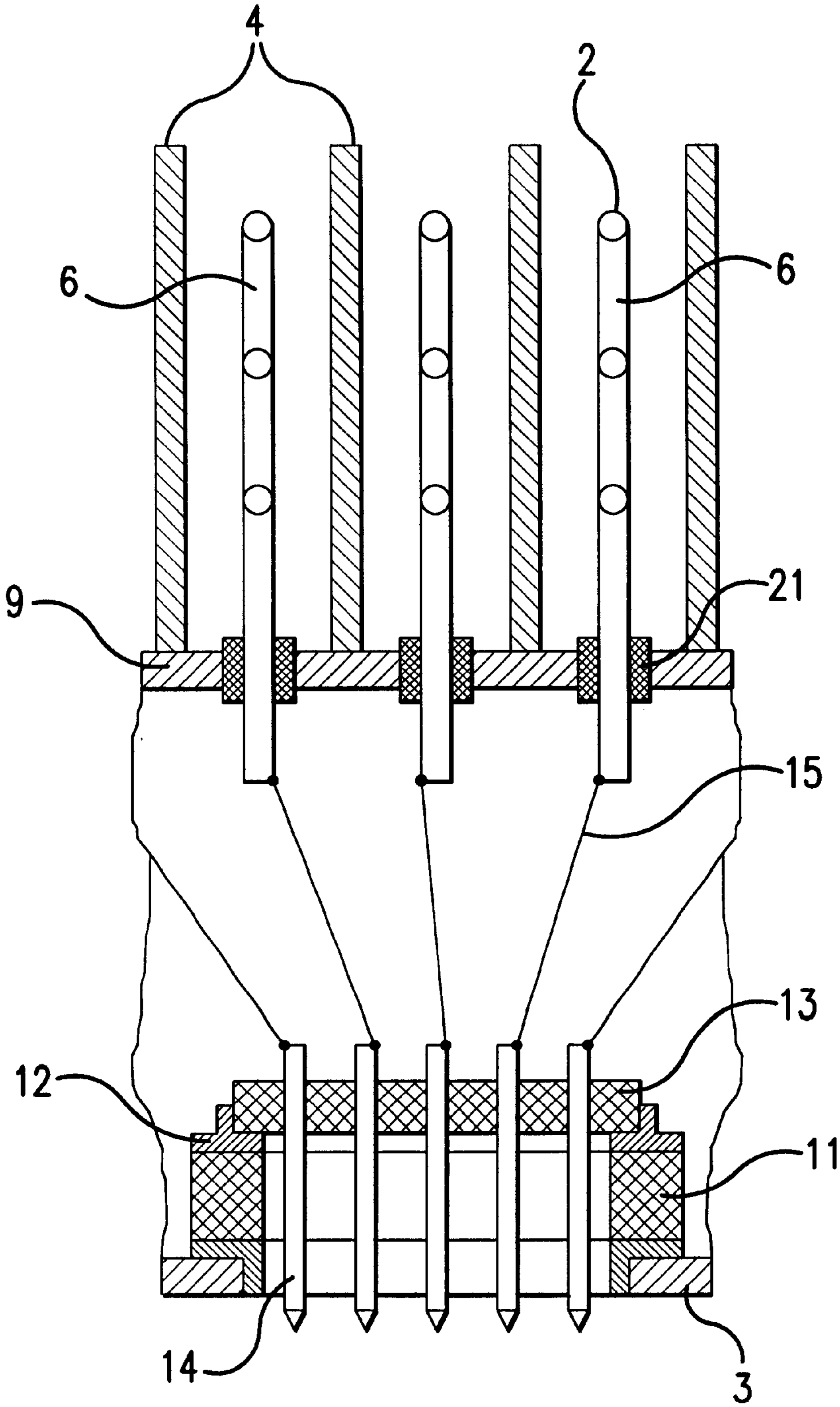
Figure 6A:
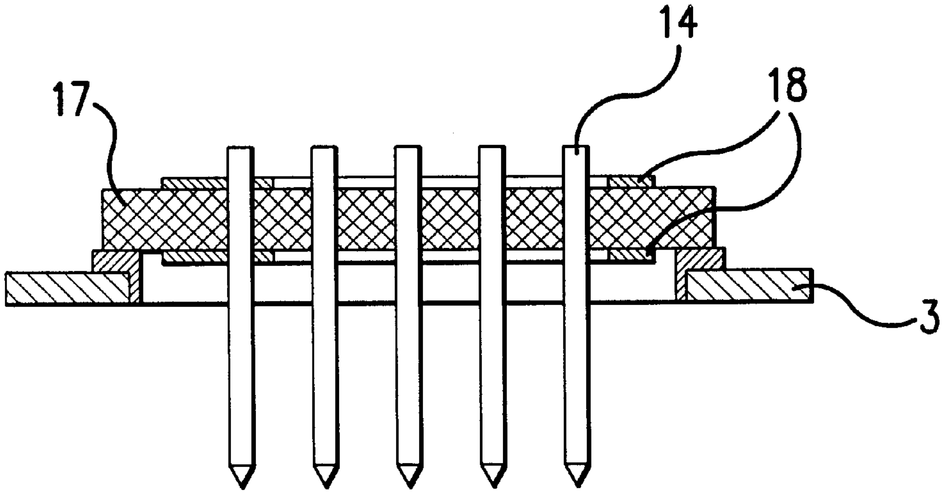
Figure 6B:
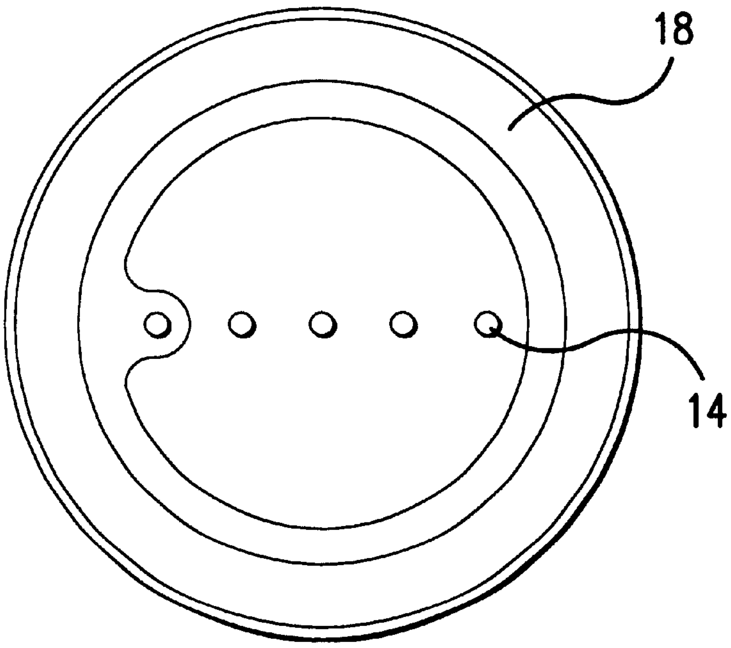
Figure 7:
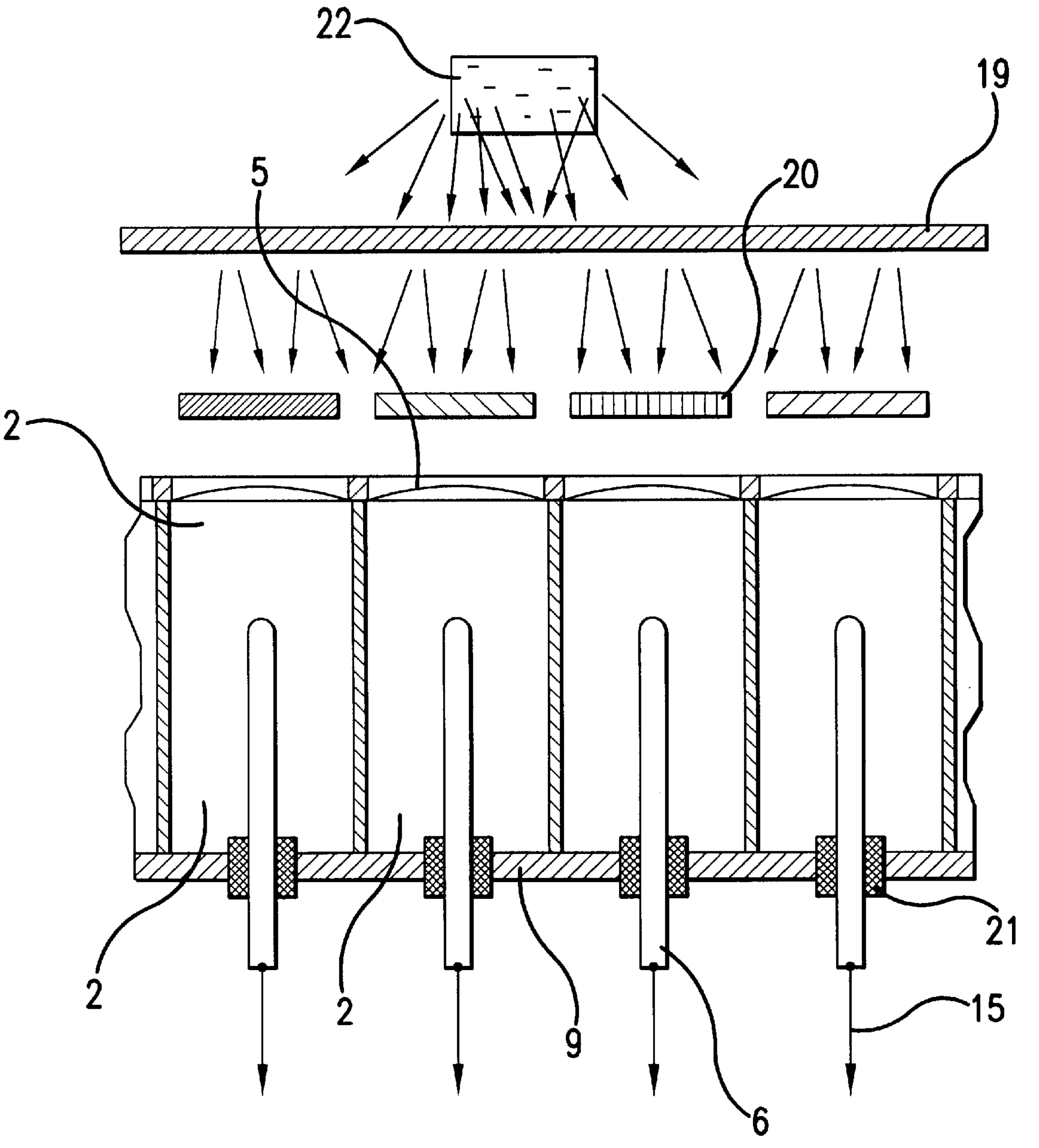
Figure 8:
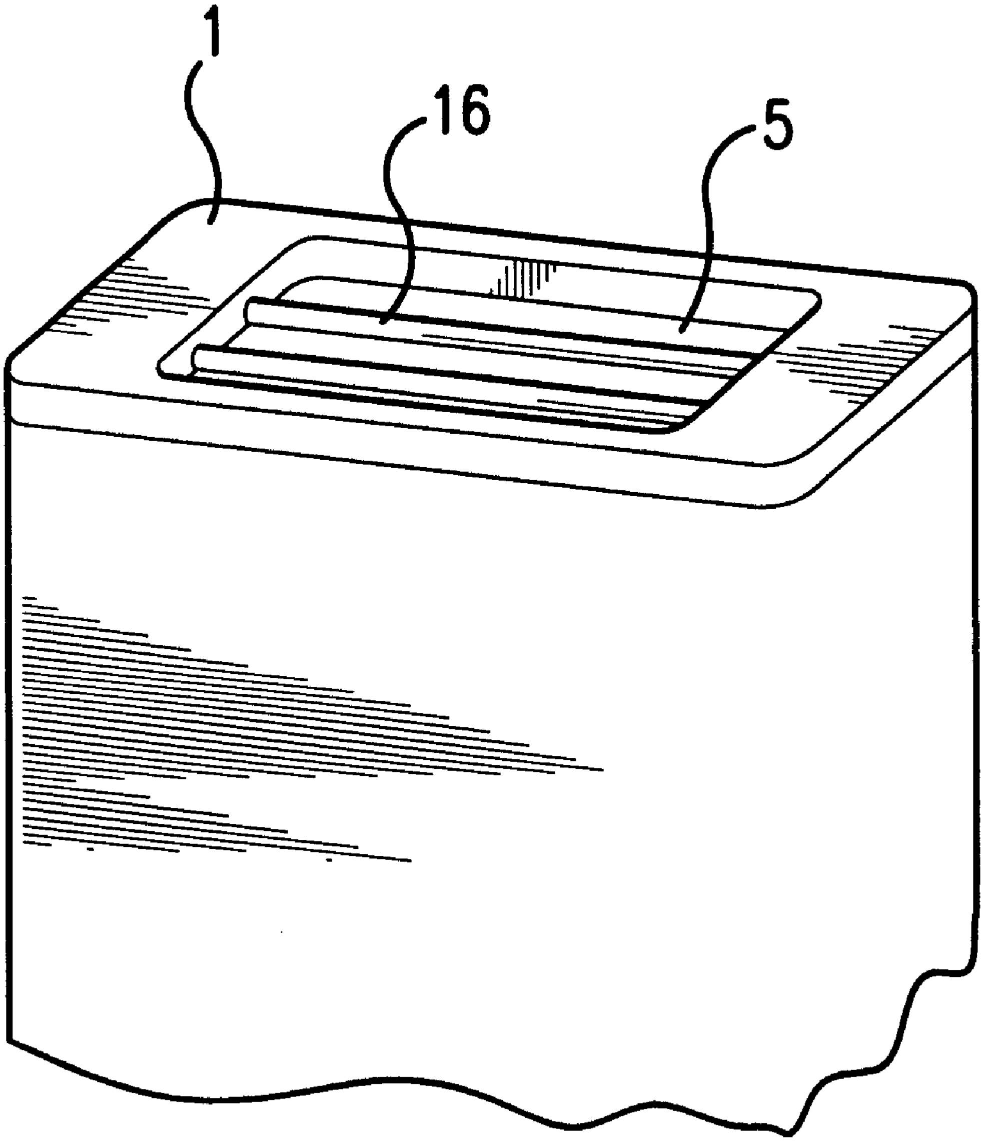

The invention will be described in greater detail in the following by means of an example. In the associated drawings, FIG. 2 shows the construction of an inventive ionization chamber with electrodes in the form of pre-stressed wires, FIG. 2*a* shows a two-row offset arrangement of measurement sections, FIG. 3 shows an electrode in antenna form, FIG. 4 shows a front view of an electrode of FIG. 1, FIG. 5 shows a multiple lead-through for the connections of the electrodes with an insulator and a metal ring, disposed on an insulating pipe, FIGS. 6*a*, 6*b* show a multiple lead-through with ajunction electrode as guard ring, FIG. 7 shows an ionization chamber for detecting X-radiation and several filters and FIG. 8 shows an ionization chamber with a reinforced radiation inlet window.

Figure 2:
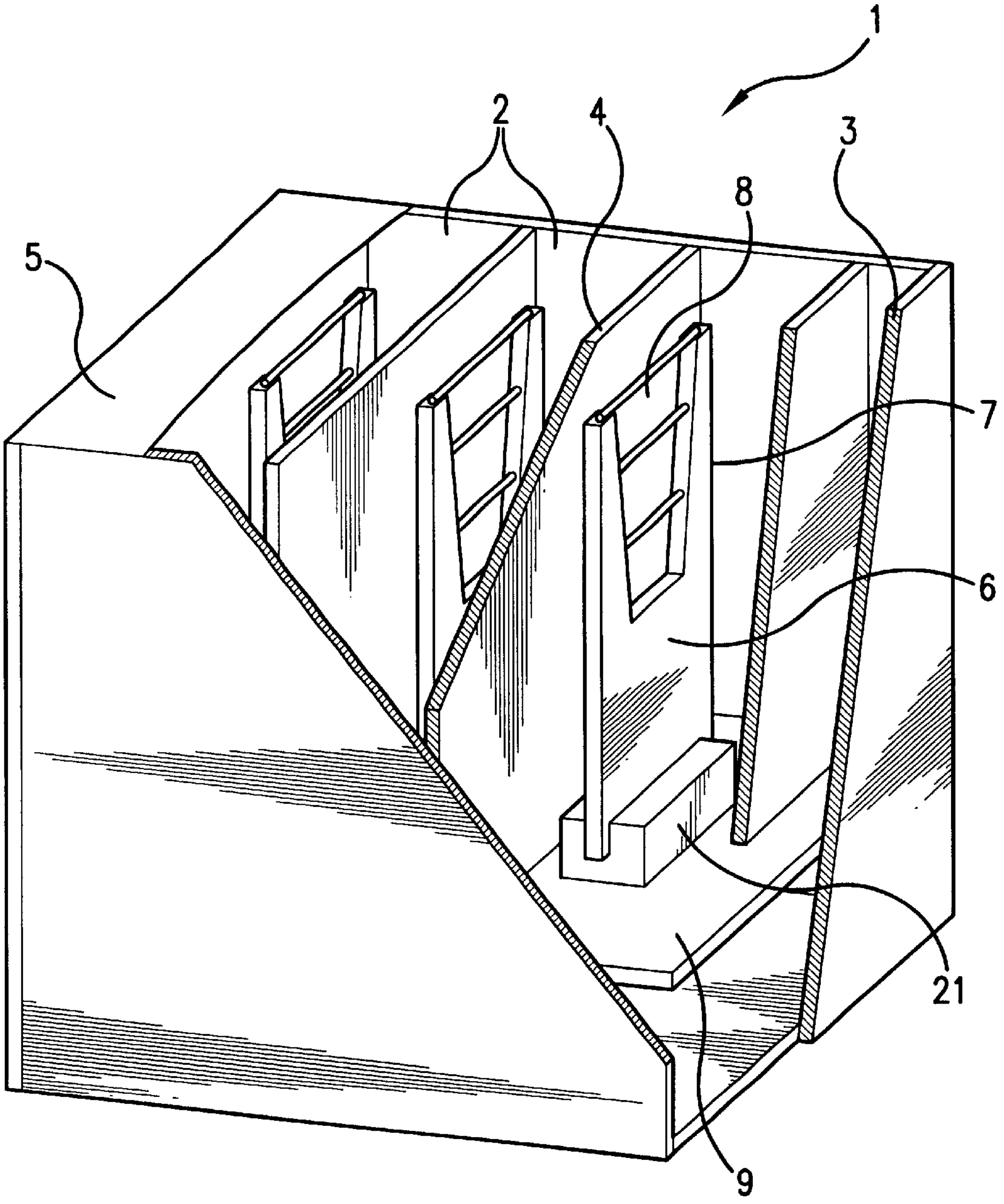

FIG. 2 shows the construction of an ionization chamber 1 with measurement sections 2 in the interior of the housing 3, which in each case form independent measurement units. Each section 2 is separated by partitions 4 from its neighboring sections. The partitions 4 ensure a minimizing of oblique irradiation through the chamber volume into the adjacent section, which is attained owing to the fact that the partitions 4 extend into the immediate vicinity of the radiation inlet window 5, which forms the upper end of the housing 3.

Figure 2A:
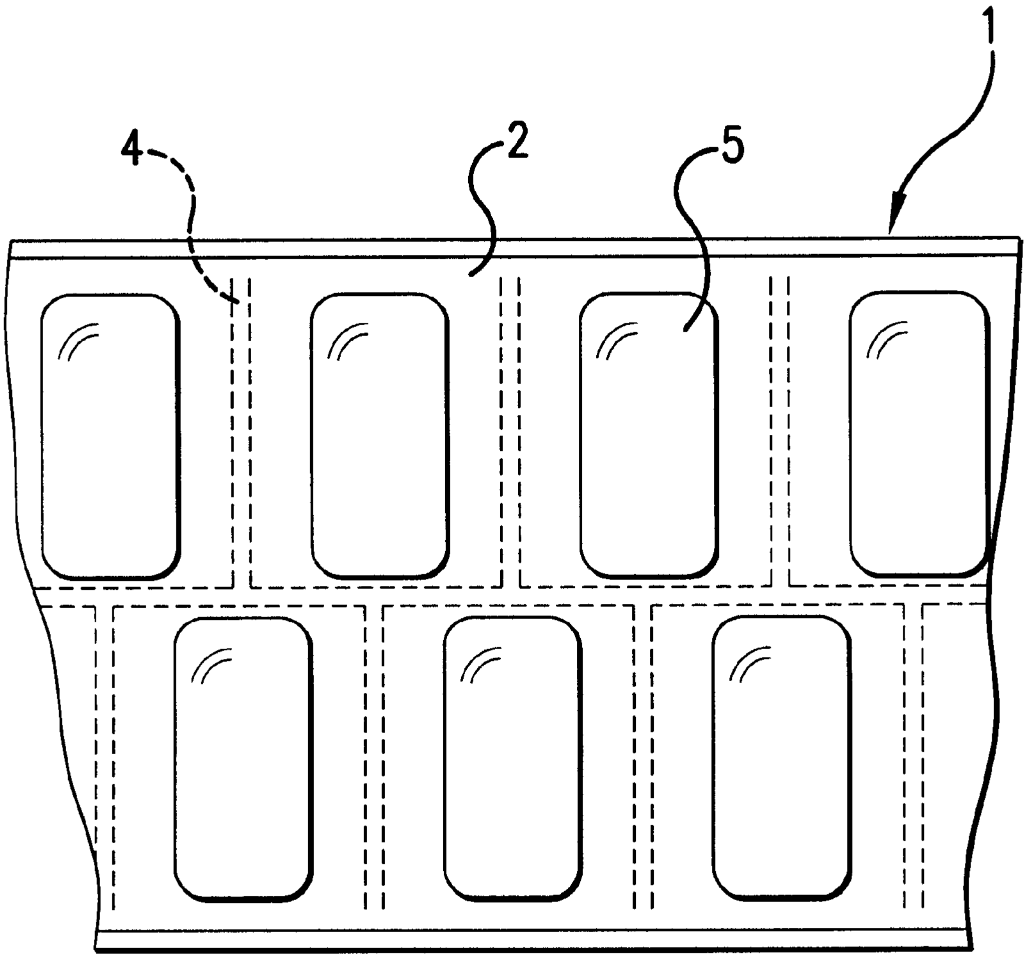

The ionization chamber 1 may, for example, have a rectangular cross section and the measurement sections 2 can also be disposed offset to one another in two or more rows (FIG. 2*a*).

Within each measurement section 2, an electrode 6 is disposed, which is adapted to the structural shape of the measurement section 2. Its configuration takes into account the requirement for the least possible displacement of gas, the most space-gripping electrical field, the avoidance of gas multiplications and the least possible microphony. The thickness and the dimensions of the electrode components are therefore kept small; however, minimum radii are maintained.

The electrode 6 consists either of a holding body 7, at which the pre-tensioned wires 8 are disposed, the holding body 7 being disposed free-standing on an insulator 21 on a support 9 (FIGS. 2 and 4). As shown in FIG. 3, the electrode 6 can also have the shape of a wire electrode 10 of several wires, which are joined together. The support 9 is at the potential of the guard ring.

For small chamber sections, filler gases with a high density (such as xenon) are preferably used, in order to obtain the highest possible radiation absorption close to the radiation inlet window 5 of the ionization chamber 1.

In order to be able to guide the signals of all electrodes 6 parallel to the outside, a multiple lead-through with a guard ring is used. This multiple lead-through consists of an insulated pipe 11, on which an insulator 13 is fastened over a metal ring 12, which functions as guard ring (FIG. 5). The connections 14 are passed through the insulator 13, in the form of metal pins, which are connected over signal leads 15 with the electrodes 6. In this way, a multiple lead-through with a guard ring, common to all signal leads 15 or connections 14, is formed, and the cost per signal brought out is clearly reduced in comparison with conventional, threefold concentrated lead-throughs. The signals are supplied to current-voltage converters, which are not shown and the output signal of which is processed by the respective measurement system.

If the guard ring principle is limited only to surface currents, it is possible to realize a configuration, which is even simpler than the one described above.

FIG. 6 shows such a multiple lead-through with several connections 14 in an insulator 17 of a highly insulating material. On the surface of either side of the insulator 17, rings in the form of junction electrodes 18 are applied around the connections 14, the potential of which acts as guard ring. The guard ring potential is taken to the inside over one of the connections 14. With this arrangement, exclusively surface currents on the insulating material between the housing and the collector electrodes are prevented.

An ionization chamber 1 with several sections 2, as described above, can also be used especially for detecting X-radiation in such a manner, that individual measurement sections 2 are exposed to differently filtered radiation. This is accomplished owing to the fact that two filters 20 are disposed between the material 19 being measured and the individual measurement sections. The radiation, emanating from a radiation source 22, receives its characteristic energy spectrum in front of the filter 20 due to the absorption or fluorescence behavior of the material 19 being measured. By a suitable selection of appropriate, different filters 20, a material, consisting of several components (such as paper with fillers, metal alloys) can be measured.

FIG. 8 finally shows yet another ionization chamber with a reinforced radiation inlet window 5, on the outside of which a wire 16 extends, which is fastened, for example, by means of a welded connection.

Ionization Chamber for Radiometric Measuring Instruments

List of Reference Symbols

1 ionization chamber
2 measurement section
3 housing
4 partition
5 radiation inlet window
6 collector electrode
7 holding body
8 wire
9 support
10 wire electrode
11 insulating pipe
12 metal ring
13 insulator
14 connection
15 signal lead
16 wire
17 insulator
18 junction electrode
19 material being measured
20 filter
21 insulator
22 radiation source

What is claimed is:

1. An ionization chamber for radiometric measuring instruments, comprising:

a housing, which is filled with an ionizable gas having at least one radiation inlet window;

a plurality of collector electrodes, having a potential different from that of the housing;

a plurality of insulated electrical connections each extending outside of the housing through an insulator and being respectfully connected to the collector electrodes;

the housing having an interior divided into a plurality of adjacent and mutually delineated measurement sections, each measurement section including a collector electrode of the plurality of collector electrodes; and a guard ring that is an electrically conductive region which surrounds the insulated electrical connections as a group such that the guard ring is disposed electrically insulated from the housing as well as from the insulated electrical connections, wherein the guard ring is in a currentless state at the potential of at least one of the collector electrodes.

2. The ionization chamber of claim 1 wherein the guard ring is connected electrically with said at least one of the plurality of insulated electrical connections.

3. The ionization chamber of claim 1 or 2, wherein the guard ring is constructed as a metal ring, which surrounds the insulator and encloses the plurality of insulated electrical connections.

4. The ionization chamber of claim 1 or 2, further comprising an insulating pipe, wherein the insulator is disposed on the insulating pipe, which is connected gas-tight with the housing.

5. The ionization chamber of claim 1 or 2, wherein the guard ring is constructed as a plurality of junction electrodes, which surrounds the plurality of insulated electrical connections at least on one side of the insulator.

6. The ionization chamber of claim 5, wherein the plurality of junction electrodes are disposed inside as well as outside of the housing on said one side and another side of the insulator and the plurality of junction electrodes are connected electrically with one another.

7. The ionization chamber of claim 1 or 2, wherein the measurement sections are delineated from one another with partitions, which extend into an immediate vicinity of the at least one radiation inlet window.

8. The ionization chamber of claim 1 or 2, further comprising a support wherein, the support is within the housing and is opposite the at least one radiation inlet window such that the support extends over all said measurement sections and is disposed electrically insulated from the housing.

9. The ionization chamber of claim 8, wherein the support has the same potential as the guard ring.

10. The ionization chamber of claim 9, further comprising a plurality of holders and a plurality of second insulators wherein the plurality of collector electrodes are disposed on said plurality of holders, and said plurality of holders are fastened over the plurality of second insulators to the support.

11. The ionization chamber of claim 10, wherein the plurality of collector electrodes have at least one pre-stressed wire which is fastened to at least one holder of the plurality of holders.

12. The ionization chamber of claim 11, wherein the at least one pre-stressed wire is a plurality of pre-stressed wires disposed parallel to one another and perpendicular to a direction of entry of the radiation.

13. The ionization chamber of claim 8, wherein the plurality of collector electrodes are one of a pre-stressed sheets and sheet strips.

14. The ionization chamber of claim 1 or 2, wherein the ionization chamber has a rectangular or square cross section and the measurement sections are one of disposed next to one another and in several rows offset to one another.

15. The ionization chamber of claim 1 or 2, wherein the ionization chamber has a circular cross section.

16. The ionization chamber of claim 15, wherein the measurement sections in the ionization chamber are disposed radially next to one another.

17. The ionization chamber of claim 15, wherein the measurement sections in the ionization chamber are disposed concentrically to one another.

18. An ionization chamber for radiometric measuring instruments, comprising:

a housing, which is filled with an ionizable gas having at least one radiation inlet window;

a plurality of collector electrodes, having a potential different from that of the housing;

a plurality of insulated electrical connections each extending outside of the housing through an insulator and being respectfully connected to the collector electrodes;

the housing having an interior divided into a plurality of adjacent and mutually delineated measurement sections, each measurement section including a collector electrode of the plurality of collector electrodes;

a guard ring that is an electrically conductive region which surrounds the insulated electrical connections as a group such that the guard ring is disposed electrically insulated from the housing as well as from the insulated electrical connections; and a plurality of filters for X-radiation being disposed above the radiation inlet window, wherein the guard ring is in a currentless state at a potential of at least one of the collector electrodes.

19. An ionization chamber for radiometric measuring instruments, comprising:

a housing, which is filled with an ionizable gas having at least one radiation inlet window;

a plurality of collector electrodes, having a potential different from that of the housing;

a plurality of insulated electrical connections each extending outside of the housing through an insulator and being respectfully connected to the collector electrodes;

the housing having an interior divided into a plurality of adjacent and mutually delineated measurement sections, each measurement section including a collector electrode of the plurality of collector electrodes;

a guard ring that is an electrically conductive region which surrounds the insulated electrical connections as a group such that the guard ring is disposed electrically insulated from the housing as well as from the insulated electrical connections; and a plurality of filters for X-radiation being disposed above the radiation inlet window, wherein the guard ring is in a currentless state at the potential of at least one of the collector electrodes by being connected to one insulated electrical connection of the plurality of insulated electrical connections.

20. The ionization chamber of claim 18 or 19, wherein a filter of the plurality of filters is assigned to each measurement section of the ionization chamber, respectively.

21. The ionization chamber of claim 20, wherein the plurality of filters each have different filtering properties which are matched to one another.

22. An ionization chamber for radiometric measuring instruments, comprising:

a housing, which is filled with an ionizable gas having at least one radiation inlet window;

a plurality of collector electrodes, having a potential different from that of the housing;

a plurality of insulated electrical connections each extending outside of the housing through an insulator and being respectfully connected to the collector electrodes;

the housing having an interior divided into a plurality of adjacent and mutually delineated measurement sections, each measurement section including a collector electrode of the plurality of collector electrodes;

a guard ring that is an electrically conductive region which surrounds the insulated electrical connections as a group such that the guard ring is disposed electrically insulated from the housing as well as from the insulated electrical connections; and one of at least one wire and a rib extending over the outside of the radiation inlet window and being fastened to the radiation inlet window, wherein the guard ring is in a currentless state at a potential of at least one of the collector electrodes.

23. The ionization chamber of claim 1 or 2, wherein the radiation inlet window is partially covered in such a manner, that a transverse profile section is measured seamlessly and unambiguously when the measurement sections are disposed in rows.

24. An ionization chamber for radiometric measuring instruments, comprising:

a housing, which is filled with an ionizable gas having at least one radiation inlet window;

a plurality of collector electrodes, having a potential different from that of the housing;

a plurality of insulated electrical connections each extending outside of the housing through an insulator and being respectfully connected to the collector electrodes;

the housing having an interior divided into a plurality of adjacent and mutually delineated measurement sections, each measurement section including a collector electrode of the plurality of collector electrodes;

a guard ring that is an electrically conductive region which surrounds the insulated electrical connections as a group such that the guard ring is disposed electrically insulated from the housing as well as from the insulated electrical connections; and one of at least one wire and a rib extending over the outside of the radiation inlet window and being fastened to the radiation inlet window, wherein the guard ring is in a currentless state at the potential of at least one of the collector electrodes by being connected to one insulated electrical connection of the plurality of insulated electrical connections.

* * * * *